United States Patent
Komi et al.

(10) Patent No.: US 7,583,886 B2
(45) Date of Patent: Sep. 1, 2009

(54) INFORMATION PROCESSOR

(75) Inventors: Hironori Komi, Tokyo (JP); Shinichi Obata, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/052,940

(22) Filed: Feb. 7, 2005

(65) Prior Publication Data
US 2005/0286859 A1   Dec. 29, 2005

(30) Foreign Application Priority Data
Jun. 23, 2004   (JP)   ............... 2004-184408

(51) Int. Cl.
*H04N 5/76*   (2006.01)
(52) U.S. Cl. ............... 386/46; 386/124; 386/125; 455/3.06; 455/550.1; 455/556.1
(58) Field of Classification Search ............... 455/403, 455/414.1, 414.3, 3.06, 550.1, 556.1; 707/104.1; 725/62; 380/15; 386/46, 124, 125
See application file for complete search history.

(56) References Cited
U.S. PATENT DOCUMENTS

| | | | |
|---|---|---|---|
| 6,118,923 A * | 9/2000 | Rodriguez | 386/69 |
| 6,199,076 B1 * | 3/2001 | Logan et al. | 715/501.1 |
| 6,764,346 B2 * | 7/2004 | Fujita et al. | 439/638 |
| 6,832,293 B1 * | 12/2004 | Tagawa et al. | 711/115 |
| 6,942,143 B1 * | 9/2005 | Iida et al. | 235/379 |
| 7,391,967 B2 * | 6/2008 | Shizukuishi | 396/321 |
| 2003/0123853 A1 * | 7/2003 | Iwahara et al. | 386/69 |
| 2004/0152440 A1 * | 8/2004 | Yoda et al. | 455/403 |
| 2006/0126451 A1 * | 6/2006 | Shinkai et al. | 369/30.3 |

FOREIGN PATENT DOCUMENTS

| EP | 1032229 A2 * | 8/2000 |
|---|---|---|
| JP | 2001-169250 | 6/2001 |
| JP | 2002-281126 | 9/2002 |

* cited by examiner

Primary Examiner—CongVan Tran
(74) *Attorney, Agent, or Firm*—Townsend and Townsend and Crew LLP

(57) ABSTRACT

The invention provides an efficient transfer of video/audio contents recorded by a server in advance for a user to view the contents with a mobile terminal, whereby the user is relieved of troublesome operations. The information processor includes two record means for recording coded video/audio data, the second record means controls already played back data having already been viewed by the user of the data transferred from the first record means, and when data is newly transferred from the first record means, the retransfer means is provided which erases only the already played back data, and transfers the data corresponding to a capacity evacuated by the erasing from the first record means.

8 Claims, 8 Drawing Sheets

INFORMATION PROCESSOR

CROSS-REFERENCES TO RELATED APPLICATIONS

The present application is related to and claims priority from Japanese Patent Application No. 2004-184408, filed Jun. 23, 2004, and is hereby incorporated by reference for all purposes.

BACKGROUND OF THE INVENTION

The present invention relates to an information processor and in particular to a device for playback of recorded information.

The background art in the technical filed includes the JPA-No. 169250/2001 (patent document 1) as an example. This publication mentions to provide a mobile display system as the problem, which implements transferring image information from a large-capacity video server to a small-capacity mobile terminal by subdividing them, to automate complicated setting operations involving transferring at each time, and to transfer image information with a simple operation. The publication discloses a technique that manages how far the image is viewed with the terminal as an audiovisual address (ST10), in transferring the image information from the video server, determines the image to be viewed next from the audiovisual address (ST16 to ST20), and automatically transfers the image to be viewed next based on this audiovisual address (ST22 to ST26).

The MPEG video compression technology has been used in various types of devices, which digitizes image information to record them in a storage medium by means of the compression coding theory, and transfers it through communication media. There are some applied examples, such as a DVD & hard disk read/write drive using the MPEG-2 Video standard (ISO/IEC 13818-2), and a communication system between mobile terminals using the MPEG-4 Video standard (ISO/IEC 14496-2).

The recording duration becomes some hours to some hundred hours when recording image information in a HDD or a DVD; and it has become several hours when recording them in a memory IC used in a mobile phone or a mobile terminal. This extension of the recording duration has realized that a user records the recently launched digital broadcasting programs and so forth in a HDD or a DVD over a long period, duplicates them in a memory IC for the mobile terminal, and thereby views the images already recorded in the user's home while being out. And in the case of a mobile phone having the communication function, the user is able to receive and enjoy video/audio contents from the delivery server thereof by way of the network.

To view the video/audio contents by using a mobile phone or a mobile terminal will involve the necessity of the video/audio contents transferred from another device having the recording medium of a larger capacity than the storage capacities of these devices; and this transfer operation is very troublesome to the user. When the user has lots of prolonged period programs or program groups recorded in the hard disk at home, and transfers them to the mobile phone to view them in a moving transportation, if all the program contents cannot be transferred to the memory contained in the mobile phone, the user will have to transfer the data each time when coming back home. In this case, the HDD recorder does not possess the information as to how far the user has viewed the program contents recorded in the hard disk while being out, which requires the user to carry out the following operations: setting a permissible editing point to the end of the part that the user has viewed, and retransferring the part following thereafter, which the user has not yet viewed, to the memory in the mobile phone. Further, if the user has not yet viewed part of the program contents that the user had first transferred to the mobile phone, the user has to perform the following operations: erasing the other parts except that part on the side of the mobile phone, and recording the contents in the memory so as to follow thereafter, which the user edited with the HDD recorder in the same manner as the above operations.

In view of these circumstances, the conventional technique discloses a system that implements 'in transferring image information from a large-capacity video server to a small-capacity mobile terminal by subdividing them, to automate complicated setting operations involving transferring at each time, and to transfer image information with a simple operation'.

However, the conventional technique did not sufficiently consider the usability in the point of shortening the user's operation time when transferring the video data to the mobile device. For example, the conventional technique did disclose only the transfer of a piece of image information, and did not consider the usability when the user wishes to view plural image information pieces (segments) continuously (e.g., to view the program broadcast every week continuously). And in transferring the data, the conventional technique did not consider what types of user interfaces should be provided to enhance the usability.

BRIEF SUMMARY OF THE INVENTION

An information processor according to the present invention includes recording and playing back plural data segments respectively to and from a first recording medium. Some of the data segments are recorded to a second recording medium, and then played back. Information is maintained as to which segments have been transferred to the second recording medium and which have been played back from the second recording medium. Segments which have been played back from the second recording medium can then be deleted and replaced with next segments from the first recording medium.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

The preferred embodiments will be described with reference to the accompanying drawings.

Embodiment 1

Figure 1:
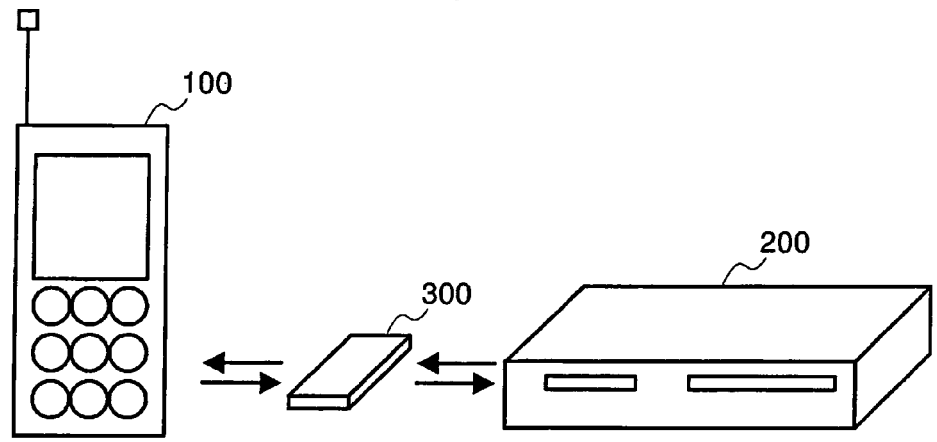
FIG. 1 is a schematic representation of a system relating to the first embodiment of the present invention.

FIG. 1 is a schematic representation of a system relating to the first embodiment of the present invention. The HDD recorder will be described as an example of the information processor. In the drawing, the numeral symbol 100 denotes the mobile phone, 200 denotes the HDD recorder, and 300 denotes a memory IC being a recording medium. In this system, the user transfers TV broadcast program contents recorded in the hard disk by the HDD recorder 200 to the memory IC 300, and views the program contents with the mobile phone 100. The construction of this system will be described in due order with the accompanying drawings. The HDD recorder 200 in this embodiment is a device that receives the ground wave analog TV broadcast and records the broadcast programs in the hard disk.

Figure 2:
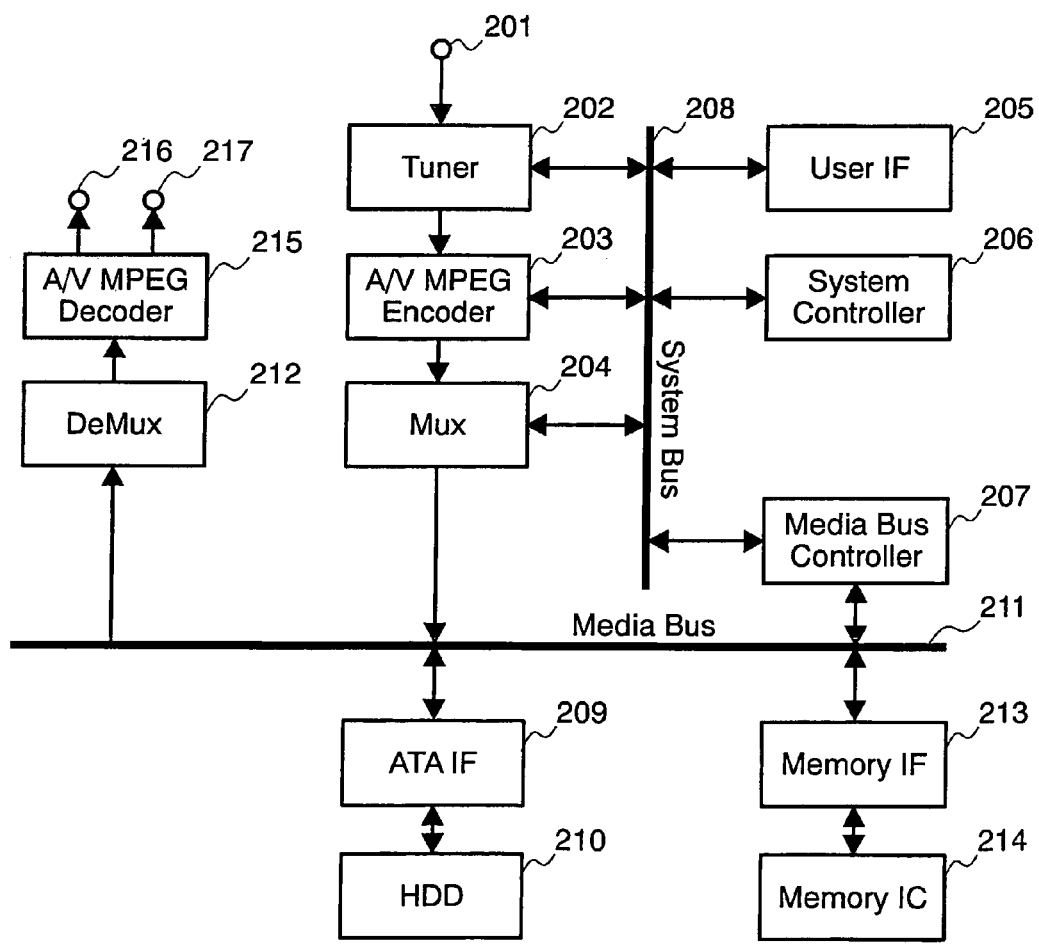
FIG. 2 is a block diagram of the HDD recorder in the first embodiment of the present invention.

FIG. 2 illustrates a construction of the HDD recorder 200. The broadcast signal supplied from an input terminal 201 by way of an antenna or a CATV cable terminal is sent to a tuner 202. The tuner 202 performs the decoding, error correction, and analog/digital conversion and so forth of this signal, and sends the output as the digital video and digital audio signals to an A/V-MPEG encoder 203.

The A/V-MPEG encoder 203 performs the coding compression of the video and audio signals each according to the MPEG 2 standard, and converts the signals into the coded strings called the video elementary stream and the audio elementary stream.

Further, the A/V-MPEG encoder 203 divides each of the bit streams into the packet string of a fixed length called the transport stream (hereunder, abbreviated as TS); and then, a multiplexing block 204 performs the time-division multiplexing of the video and audio signals in a unit of the packet. A system controller 206 performs the selection of the received programs and the control of the blocks 202 through 204. The user designates the program to be recorded and the control information such as reserved information by means of a remote controller being not illustrated; a user interface block 205 receives various signals from the remote controller, which are taught to the system controller 206 by way of a system bus 208.

The system controller 206 controls the peripheral blocks on the basis of the control information by way of the system bus 208.

The program contents that the user designated to record are subjected to the coding compression, and are outputted from the multiplexing block 204. When recording the program contents in the hard disk of the HDD, the TS data outputted from the multiplexing block 204 is transmitted to an ATA interface 209 by way of a media bus 211 such as the PCI bus. While performing the handshaking by the command with an HDD 210 according to the ATA standard being the common standard for the HDD, the ATA interface 209 records the received TS data in the hard disk of the HDD 210. Here, the data and time information of the program and so forth are designated by the system controller 206, and are recorded simultaneously with the program contents by the HDD 210.

The program contents data fed into the HDD 210 are recorded according to a predetermined file system. This embodiment assumes the format called the UDF (Universal Disk Format) used in the DVD and HDD, etc., as the file system. The file to record one-program contents based on the UDF is opened simultaneously with the start of recording, and the contents are written additionally in the order coded by the A/V-MPEG encoder 203. This file is called the AV stream file in this embodiment.

When the AV stream file is recorded, the management information is simultaneously recorded, which manages that the information of which time is recorded at which sector position.

This is called the record management information. The record management information is updated in the system controller 206 during recording whenever necessary, which is DMA-transferred by a media bus controller 207 in the interval while the program contents data is transmitted from the multiplexing block 204 to the ATA IF 209, and is stored in an area for the record management information of the HDD 210.

Owing to the record management information, when the user intends to search and playback the broadcast program at a specific time, the user is able to refer to the storage position of the program contents corresponding to the designated time.

The HDD 210 reads out the program contents from the storage position, and a demultiplexer 212 separates the contents data into video packets and audio packets, which are sent to an A/V MPEG decoder 215. The MPEG decoder 215 expands the coded/compressed signals from the demultiplexer 212, decodes the programs designated by the user, and outputs the video and audio signals from terminals 216 and 217 to an external display and monitoring device.

When the transfer command by the user is notified to the system controller 206 by way of the user IF 205, some of the program contents recorded in the hard disk of the HDD 210 are transferred to a memory IC 214 through a memory I/F 213. Here, the information for managing which program contents are stored in which file is recorded in the memory IC 214 as the record management information in the same manner as the HDD 210.

Figure 3:
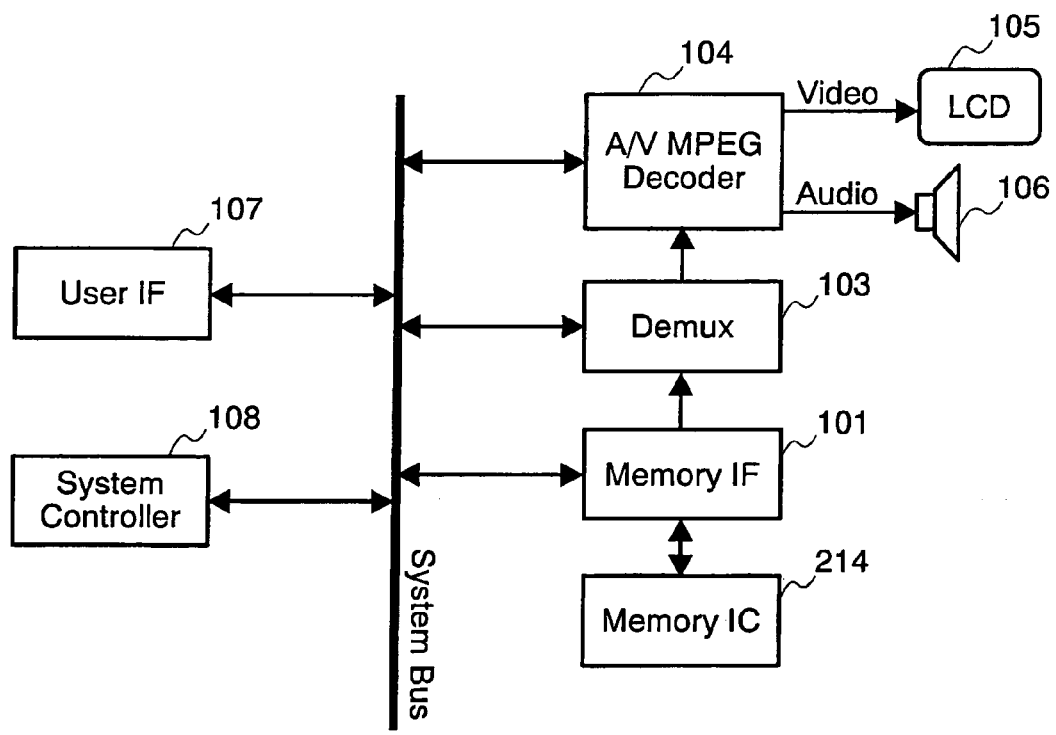
FIG. 3 is a block diagram of the mobile phone in the first embodiment of the present invention.

FIG. 3 illustrates a schematic construction, in which the memory IC 214 is mounted on the mobile phone 100 and the information recorded by the HDD 210 is played back.

When the user plays back the information in the memory IC through the button operations, the playback command is notified to a system controller 108 through a user IF 107. Receiving this command, the system controller 108 issues a command to make a memory IF 101 read out the program contents in the memory IC 214 recorded in advance, and the memory IF 101 reads out the specified program contents from the memory IC 214. Next, a demultiplexer 103 demultiplexes the read-out program contents into the TS packets, an A/V MPEG decoder 104 performs the expansion processing to the audio and video compressed signals each, and a LCD display 105 and a speaker 106 outputs the decoded video and audio signals.

Here, the information on the read-out-contents part of the programs read out from the memory IC 214 for the user to view is recorded in the memory IC 214 as playback management information. The information on the free storage capacity of the memory IC 214 is updated as well. Thereby, it becomes possible to discriminate the portion to be continuously played back from the portion being already viewed. The memory IC with a portion already played back is mounted again on the HDD recorder 200, where the portion already played back is deleted, and new program contents are recorded.

Figure 4:
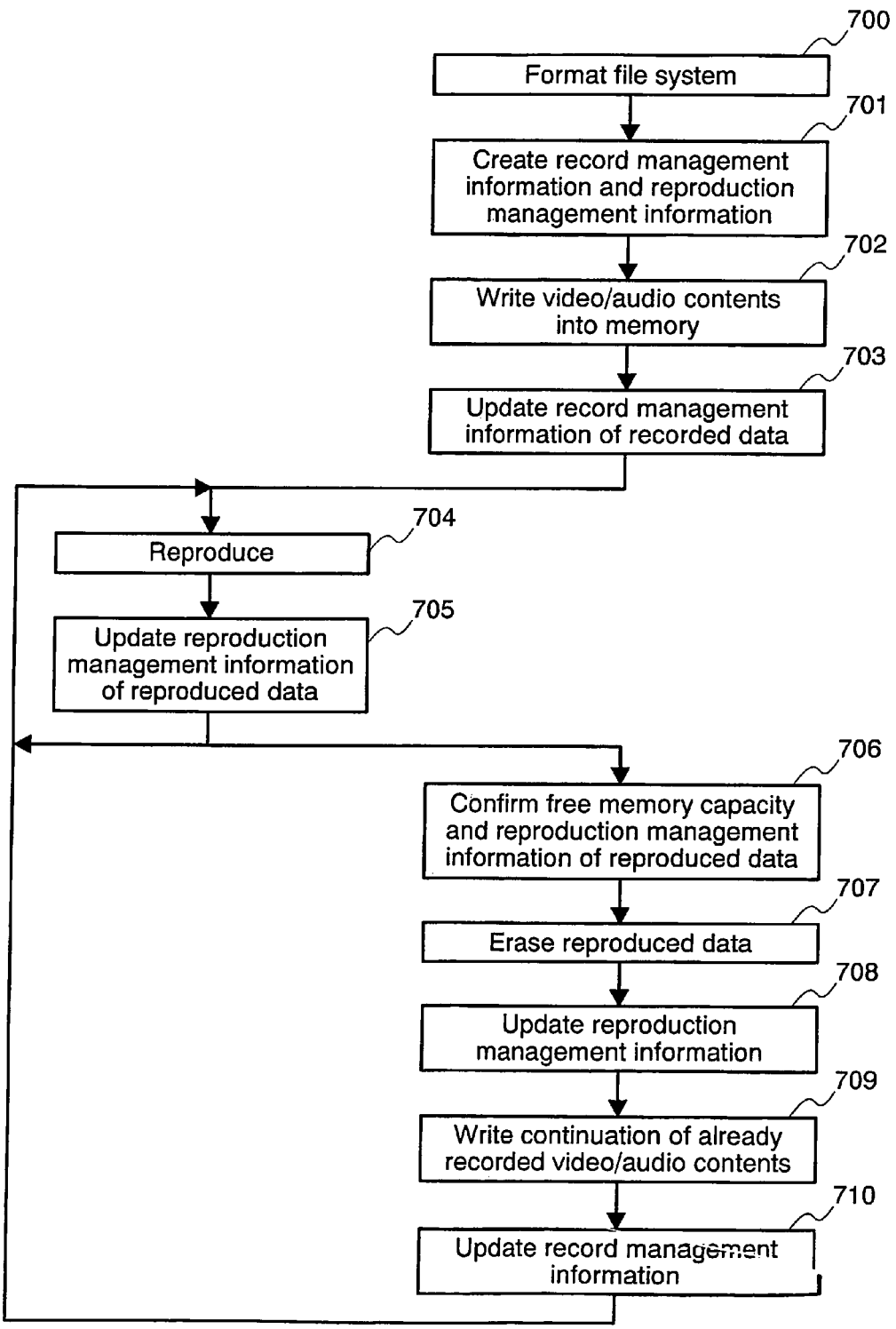
FIG. 4 is a flowchart of the data transfer by way of the memory IC in the first embodiment of the present invention.

FIG. 4 illustrates the flow of the above processing that is typically performed by executable program code. The memory IC is subjected to the file system formatting at the start of use (700), which makes the memory IC accessible to the file. Next, the record management information and playback management information are created (701). As the HDD recorder 200 performs the writing of video and audio contents to the memory IC (702), the record management information is updated in regard to the recorded program contents, and the information showing which program contents are recorded in which areas of the memory IC is written (703). Next, the memory IC 214 is transferred to the mobile phone 100, and the program contents in the memory IC are played back (704). The information as to which part is played back is recorded in the playback management information. When playback is continuously performed, the playback management information is updated at any time (705).

When the user transfers the memory IC again to the HDD recorder 200 in this state, and makes the command to record the continuation of the program contents being already transferred, first the HDD recorder 200 reads out the free storage capacity of the memory IC and the playback management information, and the user recognizes that the files until which part of the program contents being already recorded in the memory IC is played back (706). Next, the already played back program contents data is erased (707), the playback management information is updated accordingly, the data that is played back is erased, and the point to be played back next is maintained (708). Next, the program contents being the continuation of the already played back data is read out from the hard disk to be written in the free storage area of the memory IC (709), and the record management information corresponding to the newly recorded data is updated (710). The user mounts the memory IC with the recording completed on the mobile phone 100 in the same manner as the former, and enjoys the playback.

Figure 5:
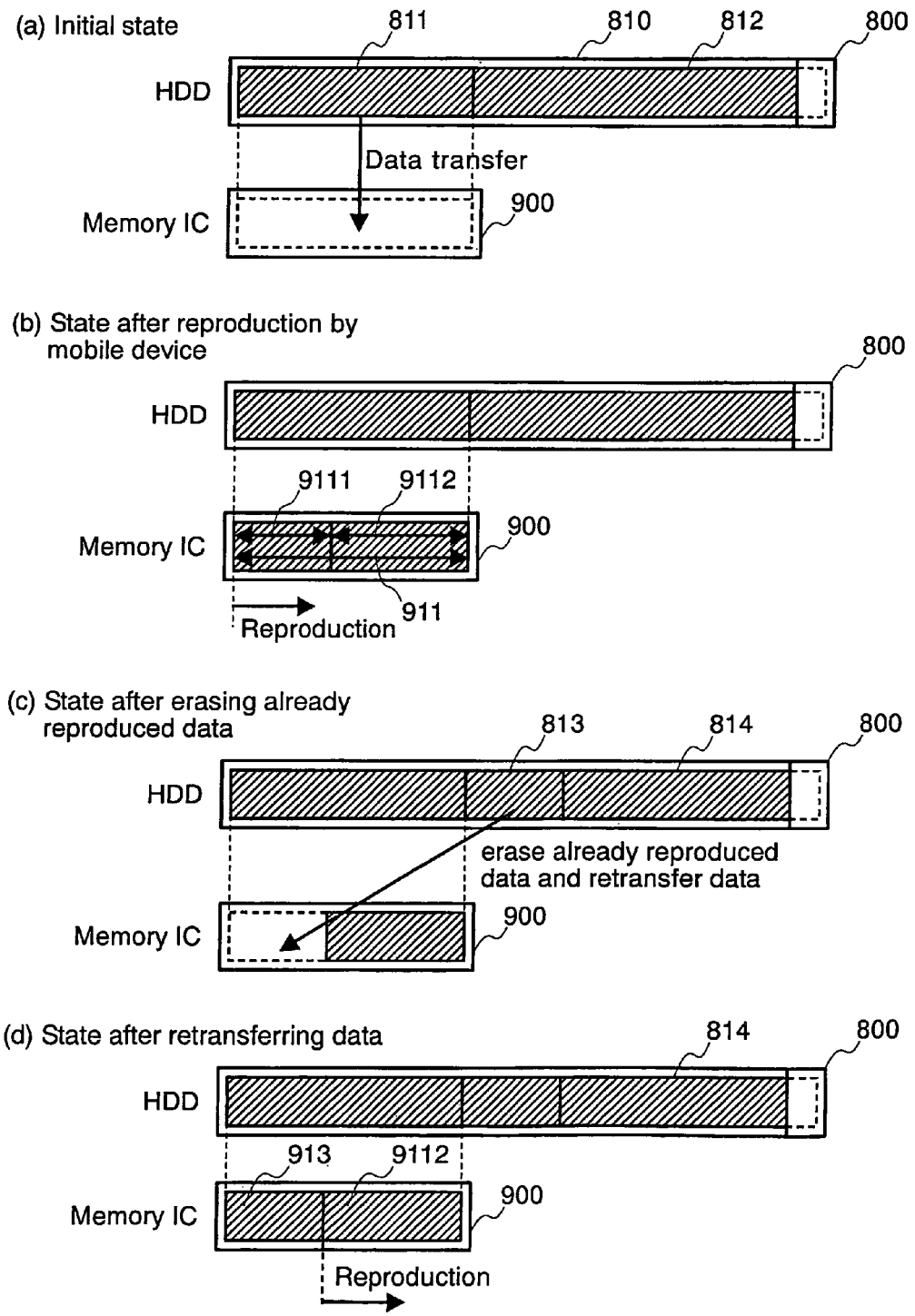
FIG. 5 is a chart illustrating the transition of the data transfer by way of the memory IC in the first embodiment of the present invention.

FIG. 5 illustrates the state that the storage locations containing the program contents in the hard disk and the program contents in the memory IC transition by transferring the data.

In the drawing, the numeral symbol 800 denotes the whole storage area of the hard disk (HDD), 900 the whole storage area of the memory IC.

It is assumed that the program contents that the user wishes to view continuously on the mobile phone are recorded in the part 810 as shown by hatching in the HDD in the first place, and the storage area 900 of the memory IC is vacant (FIG. 5A). Here, if the user demands the device to transfer the program contents to the memory IC, the program contents part (811) corresponding to the whole capacity of the memory IC 900 is taken out and is copied in the memory IC 900 (910). Thereby, the whole capacity of the memory IC is occupied with the program contents (FIG. 5B). If the area 810 is smaller than 900, the whole 810 is copied in 900.

Next, as the user plays back a part of 910 while traveling to work, the storage area 900 is divided into the already played back part (9111) of 911 and the not-yet played back part (9112) of 911. In this state, if the user mounts the memory IC on the HDD recorder and issues the instruction to record the program contents to be continued to the already played back data, the area 9111 is erased and the part 812 being the continuation of the already transferred part 811 in 810 is transferred from the leading thereof. That is, the part 813 in FIG. 5C is transferred to become the part 913 in FIG. 5D.

Further, when the user mounts the memory IC on the mobile phone to start the playback, the control is made such that the playback is performed from the leading of the part 9112 till the end of 9112, and thereafter playback of the part 913 is started.

When the capacity of the memory IC is small in this manner, and the quantity to be played back at one time is limited to a part of the memory IC because of the commuter time or the like, the user comes back home before the next occasion of playback to record the continual data corresponding to the played back quantity while sleeping in the night, for example, and thereby the user is able to efficiently use the capacity of the memory IC. That is, this system makes it easy to avoid such an inconvenient state that the user cannot view the continual contents until playing back all the data recorded in the memory IC and coming back home once.

FIG. 5 shows the state that the continuous data is stored in continuous storage locations, for the sake of convenience. However, if the physical location of the memory IC is controlled discontinuous, the equivalent effect can be achieved. To be more concrete, the correspondence between the file of the recorded program contents and the physical location is controlled on the file system; the relation between the time information of the record information existing in the memory IC and the file (record management information), and the time information on the order of playback and the time duration information of the playback-completion part until now (playback management information) are controlled, which are stored in the memory IC so that the user can refer to them; accordingly, the equivalent system can be realized.

In the case of the coding system using the inter-frame reference such as the MPEG video contents, a plan should be made such that the breakpoints of the already played back part and the not-yet played back part are controlled to be complete on the delimiting points of the GOP (Group Of Picture) structure, so that the pictures are not played back strangely on the delimiting points. Another plan should be made such that, in erasing the already played back part, some of the last part thereof is left as the not-yet played back part, and the user can view the program contents with that part overlapped when starting the playback again.

Next, the user interface of this embodiment will be described. The user interface of this embodiment is characterized by displaying a play list for recording the program contents to the memory IC from now in continuation and playing them back, already recorded part in the memory IC of this play list, and already played back part of the data recorded in the memory IC.

Figure 6:
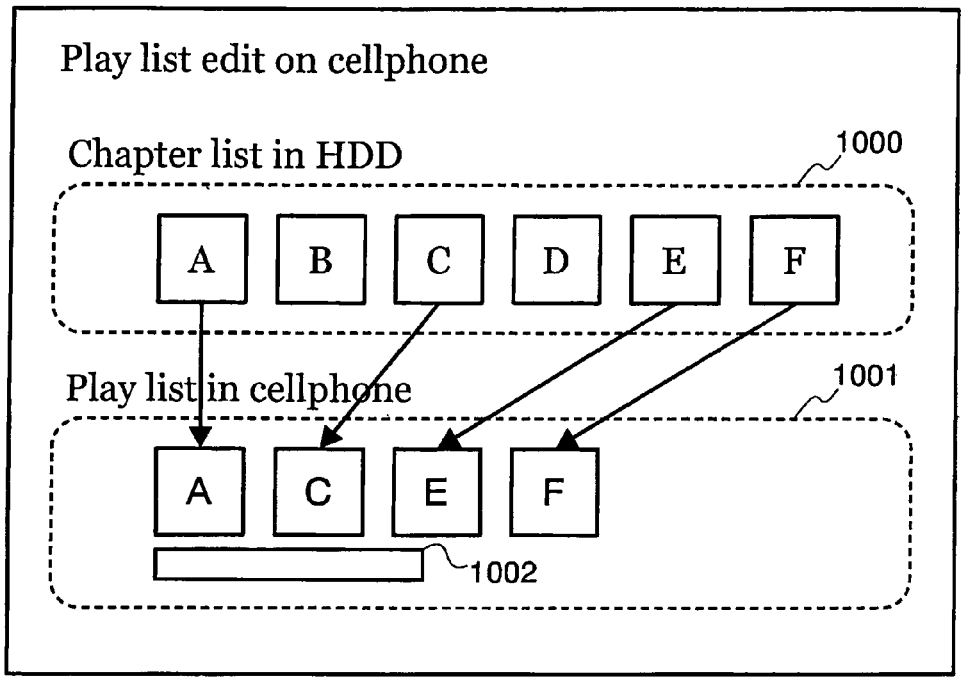
FIG. 6 is a chart illustrating a GUI construction in the first embodiment of the present invention.

FIG. 6 illustrates a GUI (Graphical User Interface) screen on the HDD recorder, in performing the data transfer to the memory IC in this embodiment. In the drawing, the numeral symbol 1000 signifies the thumbnail strings for each scene that are beforehand controlled in HDD and are treated as the editing unit. Hereafter, this scene is called the chapter. These segments can be constituent chapters in a single movie or program. The segments can belong to numerous movies or programs; e.g., segments A and B might belong to "program 1"; segments C and D might belong to "movie 1"; segment E might belong to "program 2"; and segment F might belong to "program 3". A to F show the representative thumbnails of each chapter. The area 1001 is to display the chapter strings for storing the contents in the memory IC and playing them back, which forms the play list for playing them back in due order from left.

When registering the play list in the area 1001, the user selects the candidates from the chapter strings in 1000, and arranges them in the places in 1001 according to a desired playback order to thereby update the play list in 1001. The box 1002 is to display which part in the play list 1001 is stored actually in the memory IC, which is displayed after transferring data to the memory IC. The box 1002 need not be displayed in this situation. FIG. 6 illustrates the state that all the chapters A, C and part of the chapter E are stored and the already played back data does not yet exist in the memory IC at all.

Figure 7:
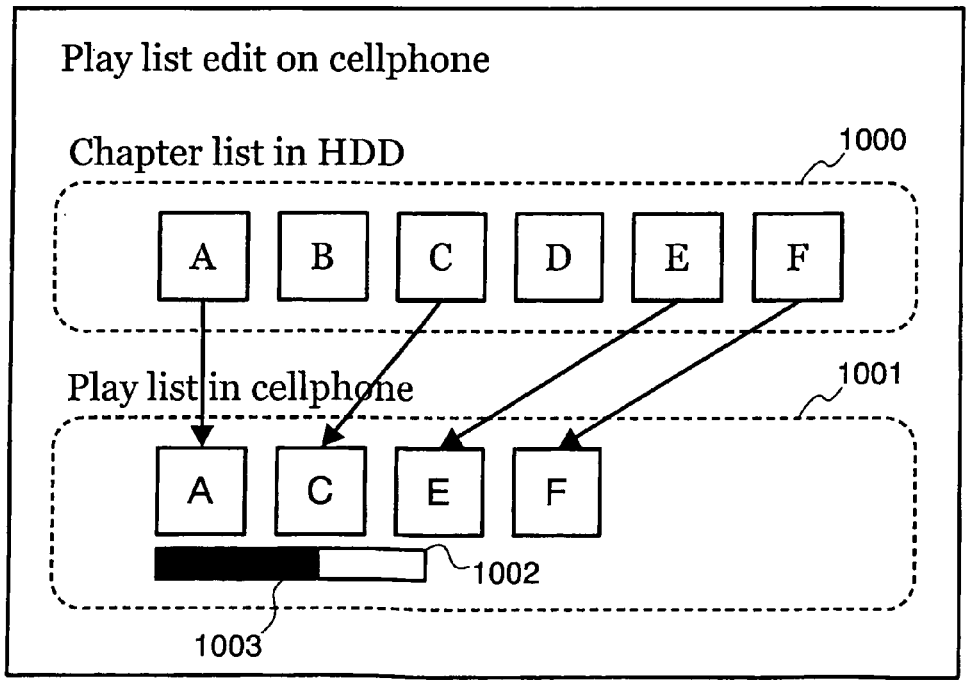
FIG. 7 is a chart illustrating a GUI construction in the first embodiment of the present invention.

FIG. 7 illustrates the state that the memory IC is once mounted on the mobile phone from the state of FIG. 6 and some of it is played back, the played back part is checked again on the HDD recorder, and the colored part 1003 shows the already played back part in the memory IC. Thereby, the user is able to know visually which part of the playback is completed. Here, if the user instructs the HDD recorder to transfer data to the memory IC by means of menu operations or button operations, the part 1003 already played back is erased, and the next part in 1002 is recorded in the memory IC by the evacuated capacity instead.

Figure 8:
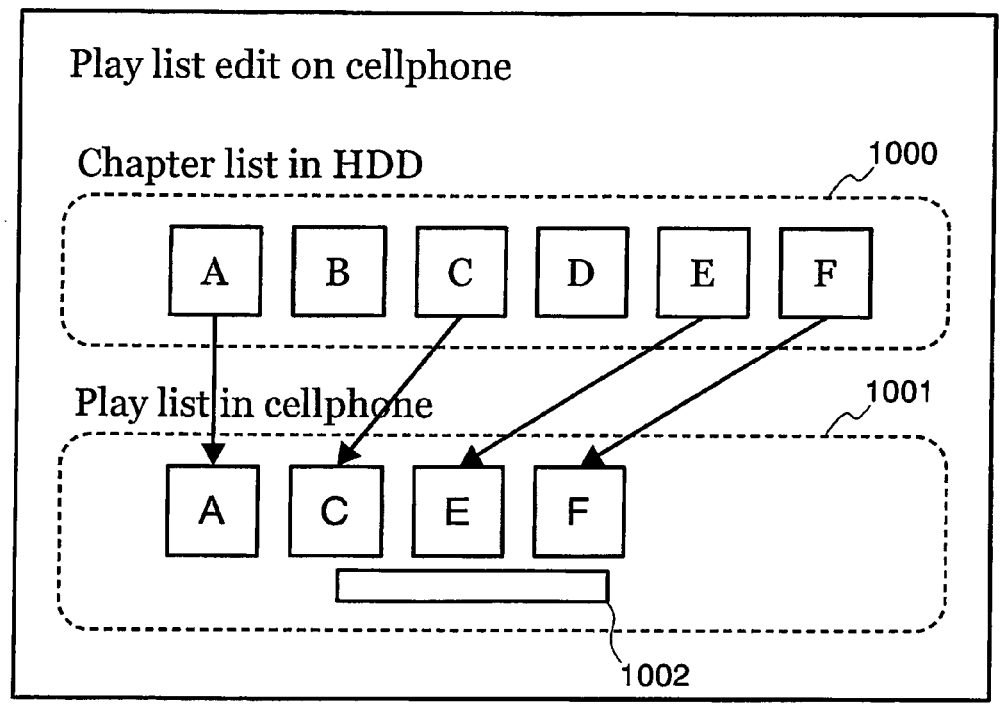
FIG. 8 is a chart illustrating a GUI construction in the first embodiment of the present invention.

FIG. 8 illustrates the state that the recorded part of 1002 is updated to correspond with the above. That is, part of the chapter C, chapter E, and part of the chapter F are recorded. Using this GUI and repeating the transfer of memory IC will make it possible to visually inform the user of the state of data transfer to the memory IC and the playback information. The parts 1001, 1002, and 1003 may be erased appropriately by scrolling left, and the already played back chapters may be erased from the inside of 1002.

In FIG. 8, the record area and the playback area are made to control the halfway position of the chapter. However, the interface may be arranged such that the chapters are automatically delimited at the delimiting positions of the already played back part and the not-yet played back part, and the thumbnails in 1000 and 1001 are automatically updated.

This GUI performs the registration of the play list 1001 by the thumbnail display; however, the equivalent effect can be achieved with a configuration using a list display by the characters only. That is, as long as the play list to be recorded and played back continuously from now on corresponding to 1001, the already recorded part corresponding to 1002, and the already played back part corresponding to 1003 are displayed to the user by any display format, the equivalent effect can be achieved.

Figure 9:
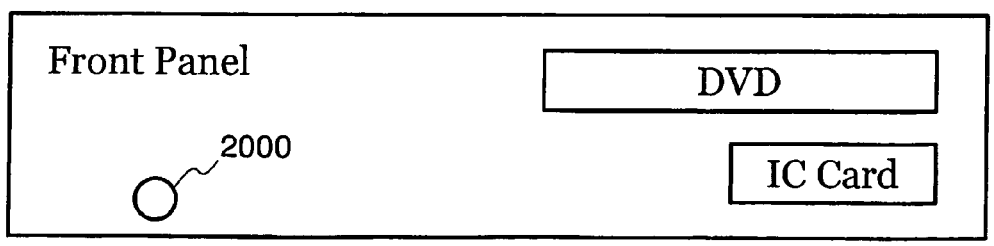
FIG. 9 is a chart illustrating the front panel of the HDD recorder in the first embodiment of the present invention.
Figure 10:
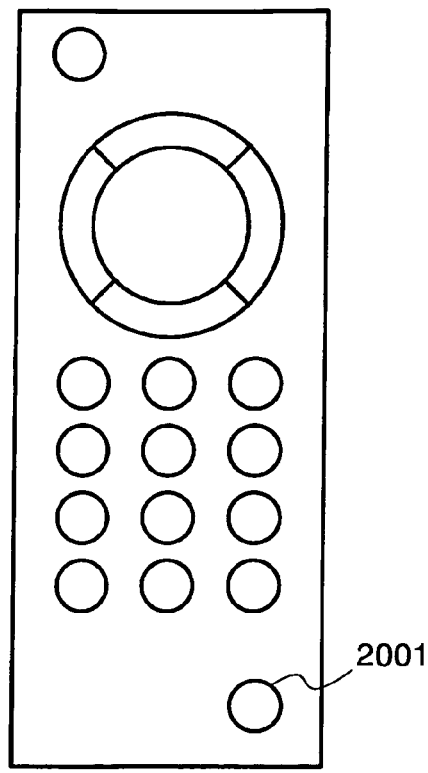
FIG. 10 is a chart illustrating the remote control unit of the HDD recorder in the first embodiment of the present invention.

FIG. 9 and FIG. 10 illustrate the interface, by which the user instructs to transfer data from the registered play list to the free storage area of the memory IC. FIG. 9 shows a button equipped on the front panel. Pressing this button can attain the processing corresponding to the transition from FIG. 7 to FIG. 8. Thereby, the batch processing can be made by a button operation as to erasing the already played back part and retransferring the data corresponding to the erased memory capacity. FIG. 10 shows an example in which a similar button is equipped on the remote controller.

To be more concrete, the user first mounts the memory IC on the HDD recorder and presses the data transfer button as mentioned above. The HDD recorder reads out the record management information and the playback management information stored in the memory IC, and detects how far the play lists are already recorded and how far the data recorded currently in the memory IC is already played back. And, the HDD recorder erases the already played back part on the memory IC, and transfers the data to be recorded next on the play list, corresponding to the erased memory capacity.

Here, the data transfer button is equipped on the HDD recorder or on the remote controller in the above example, which is not limited to this. For example, the data transfer button may be provided on the mobile phone when the HDD recorder and the mobile phone are directly connected with a cable and so forth.

Generally, the editing of the play list 1002 is the processing that the user needs a considerable time, such as selecting the thumbnails in HDD. Now, in such a case that the user edits many chapters in a lump as a play list, for example, and transfers them in increments to the memory IC every day for playback, the user only needs to remount the memory IC on the HDD recorder or on the mobile phone, and to press the data transfer button as shown in FIG. 9 and FIG. 10, so that the user can perform the desired processing. Thereby, the everyday editing work of the play list can be reduced, and the usability for the user can be enhanced.

Here, the play list is not limited to what is created from one video/audio data. That is, the user may create one play list by selecting the chapters that the user wishes to view among multiple video/audio data. For example, the user only needs to display multiple video/audio data in the area 1000 of the chapter string or to display one by one in due order, to select the chapters that the user wishes to view among them, and to insert the selected into the area 1001 of the play list. In this case, to be continued to the end of the first video/audio data, the second video/audio data is automatically transferred to the memory IC, which makes it unnecessary to set the data transfer for each of the video/audio data, which is necessary in the conventional technique, thus enhancing the usability. Especially in such a case that the user records the every week broadcast program, transfers the data of this program to the memory IC, and continuously views this program, the effect of enhanced usability is remarkable.

As shown in FIG. 7, this embodiment is characterized in that the data transfer of the chapters B and D to the memory IC is not carried out. That is, in the case of the data transfer from a large-capacity recording medium such as the HDD to a small-capacity recording medium such as the memory IC, a useless data transfer should be avoided as much as possible. Instead of transferring all the video/audio data as one unit to the memory IC by subdividing it as the conventional technique, this embodiment selects the chapters that the user views by transferring the data to the memory IC on the side of the HDD recorder in advance, and creates the play list. Thereby, it is possible to avoid a useless transfer of the program data, which the user will not view after the transfer.

This embodiment describes an example in which the play list is edited in a unit of the chapter, however it may be edited in a unit of the program.

This embodiment takes on a construction that encodes an analog broadcast record and records the result in the HDD, and transfers this to the memory IC. However, with regard to the process of the data transfer to the memory IC and the method of controlling the record management information and playback management information and so forth of this embodiment, the equivalent protocols can be employed in a device that records various digital broadcast programs in the HDD and transfers them, or in a device that transforms once recorded data into another data stream conforming to a different standard.

Embodiment 2

Figure 11:
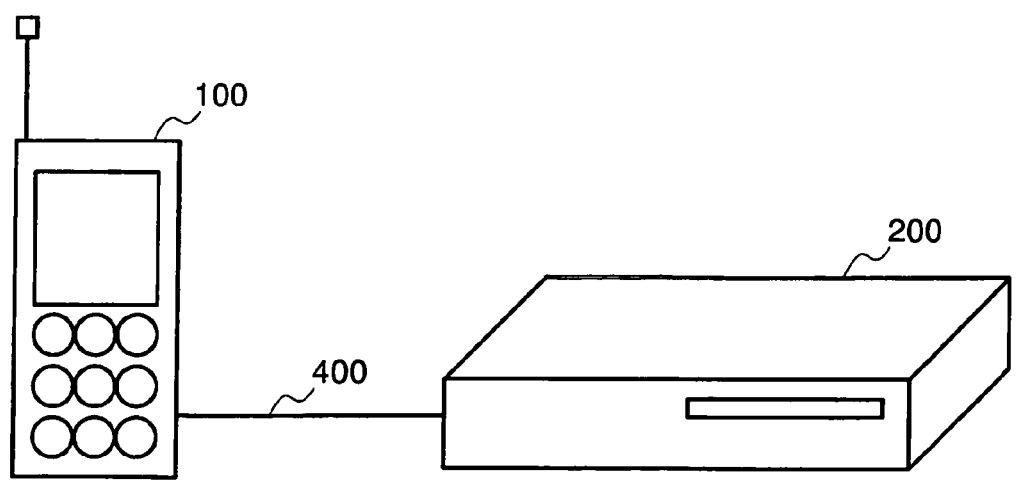
FIG. 11 is a schematic representation of a system relating to the second embodiment of the present invention.

FIG. 11 represents a system of the second embodiment, in which the data transfer between the HDD recorder and the mobile phone is performed by way of connecting to the USB network or the Ethernet (trademark) network, instead of the data transfer by way of the memory IC. In this case, the transfer of the program contents and the exchange of the record and playback management information are performed by way of the network. By dealing with the storage capacity of the memory in the mobile phone in the same manner as the memory IC of the first embodiment, the same effect as the first embodiment can be achieved. To replace the memory IF of the first embodiment by the network IF and to employ the same data transfer protocol will realize the second embodiment.

Embodiment 3

Figure 12:
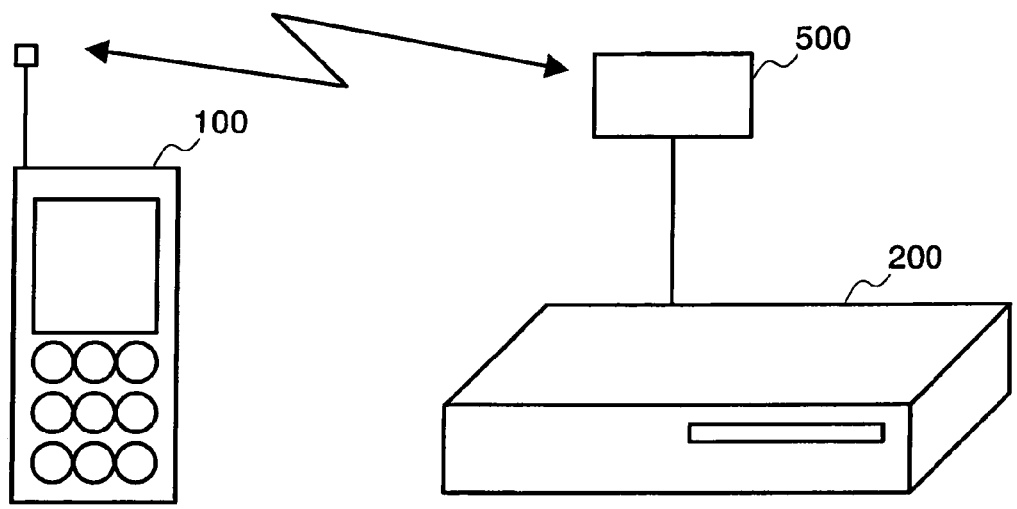
FIG. 12 is a schematic representation of a system relating to the third embodiment of the present invention.

FIG. 12 represents a system of the third embodiment, in which the data transfer between the HDD recorder and the mobile phone is performed by way of the wireless IF. In this case, the state of the memory in the mobile phone is appropriately communicated to the HDD recorder through the wireless IF. The data transfer of the program contents to the mobile phone may be performed simultaneously while viewing on the mobile phone, for example. In this case, the residual quantity of the memory in the mobile phone is notified periodically to the HDD recorder as the server, and the data transfer within the free storage capacity is performed intermittently. This function will prevent the deficiency that the mobile phone becomes unable to store the data in the memory.

While pausing the playback, the mobile phone automatically performs the communication with the HDD recorder to transfer the data in the memory on the mobile phone; when the user performs a playback operation, the program contents for long periods are available with a high possibility. Also in this case, by exchanging the data of the record and playback management information between the HDD recorder and the mobile phone while keeping synchronization, the processing can be performed with the same construction as the protocol of the data transfer in the first embodiment.

This embodiment buffers the data once in the memory; therefore, it is possible to transfer the data spending more time than the case of the data transfer in real time. Accordingly, this embodiment has the secondary effect that presents the user with higher quality pictures than the video/audio contents delivered in real time.

The above embodiments have described the data transfer between the HDD recorder and the mobile phone for the most part. However, the invention can be applied in the same manner between a home server and a mobile device, or between a commercial server and a device connected thereto. In other words, the invention can be applied to a case in which the data transfer is performed from a device having a large capacity recording medium to a device having a small capacity recording medium by subdividing the data.

The above embodiments have mainly described the video/audio data, however the invention is not limited to this. The invention can be applied to video data only, to audio data only, and to music data and so forth, or to other information and contents as well.

What is claimed is:

1. An image data recording and reproduction apparatus comprising:
    a first recording and reproduction unit configured to record image data to and to reproduce image data from a first recording medium,
    a second recording and reproduction unit configured to record image data to and to reproduce image data from a second recording medium,
    a controller configured to control the first and second recording and reproduction units so that image data are transferred from the first recording medium to the second recording medium, and
    a play list editor configured to edit a play list of image data to be transferred from the first recording medium to the second recording medium according to a selection by a user in a predetermined unit of image data recorded on the first recording medium,
    wherein the controller, in response to the user operation, is configured such that when there are already-reproduced image data recorded on the second recording medium, the already-reproduced image data are automatically deleted in a smaller unit than the predetermined unit, and next image data determined according to image data recorded on the second recording medium and the play list are automatically transferred from the first recording medium to the second recording medium in the smaller unit than the predetermined unit.

2. The apparatus of claim 1 wherein:
the predetermined unit is a chapter, and
the smaller unit is a fraction of a chapter, wherein a size of the smaller unit is determined independently of the predetermined unit according to a size of the already-reproduced data.

3. The apparatus of claim 1, further comprising:
an output unit configured to output a display including:
a first graphic of the image data recorded on the first recording medium with the predetermined unit,
a second graphic of the image data in the play list with the predetermined unit,
a third graphic which displays how much image data in the play list are transferred from the first recording medium to the second recording medium with the smaller unit, and
a fourth graphic which displays how much image data recorded on the second recording medium are reproduced with the smaller unit.

4. The apparatus of claim 1 wherein:
the controller, in response to a single operation of the user, is configured such that the already-reproduced image data are automatically deleted and the next image data are transferred in the smaller unit than the predetermined unit.

5. The apparatus of claim 1 wherein:
the second recording and reproduction unit is configured to store record management information indicating how much image data in the play list are transferred from the first recording medium to the second recording medium,
the controller is configured to use the record management information to transfer the next image data from the first recording medium to the second recording medium in the smaller unit.

6. The apparatus of claim 1 wherein:
the second recording and reproduction unit is configured to generate reproduction management information indicating how much image data recorded on the second recording medium are reproduced, wherein the reproduction management information is recorded on the second recording medium when image data recorded on the second recording medium are reproduced, and the controller is configured to use the reproduction management information so that the already-reproduced image data are deleted in the smaller unit than the predetermined unit.

7. The apparatus of claim 1 wherein:
the first recording medium is built-in, and
the second recording medium is detachable.

8. The apparatus of claim 1 wherein:

the first recording medium is a hard disk, and
the second recording medium is a memory IC.

* * * * *